United States Patent [19]

Iwata et al.

[11] 4,112,885
[45] Sep. 12, 1978

[54] THROTTLE VALVE CONTROL SYSTEM FOR AN INTERNAL COMBUSTION ENGINE

[75] Inventors: Toshiharu Iwata; Tadashi Hattori; Kouichi Mori, all of Okazaki; Tomojiro Akiyama, Susono, all of Japan

[73] Assignees: Nippon Soken, Inc., Nishio; Toyota Jidosha Kogyo Kabushiki Kaisha, Toyota, both of Japan

[21] Appl. No.: 688,060

[22] Filed: May 17, 1976

[30] Foreign Application Priority Data

May 23, 1975 [JP] Japan .................................... 50/62408

[51] Int. Cl.² ........................... F02P 9/00; F02D 1/04
[52] U.S. Cl. .................................... 123/98; 123/102; 251/131
[58] Field of Search ............. 123/98, 102; 180/105 E; 251/131

[56] References Cited

U.S. PATENT DOCUMENTS

| | | | |
|---|---|---|---|
| 2,192,714 | 3/1940 | Norman et al. | 180/105 E |
| 3,232,092 | 2/1966 | Glassey | 251/131 |
| 3,590,873 | 7/1971 | Duff | 251/131 |
| 3,752,187 | 8/1973 | Marr | 251/131 |

*Primary Examiner*—Ronald B. Cox
*Attorney, Agent, or Firm*—Cushman, Darby & Cushman

[57] ABSTRACT

A throttle valve control system comprising an accelerator position sensor for detecting the position of an accelerator pedal, a throttle valve opening sensor for detecting the opening of a throttle valve and a control circuit for receiving the output signals of the sensors to control a reversible motor which opens and closes the throttle valve, whereby the movement of the accelerator pedal is rapidly and accurately transmitted to the throttle valve.

10 Claims, 9 Drawing Figures

THROTTLE VALVE CONTROL SYSTEM FOR AN INTERNAL COMBUSTION ENGINE

BACKGROUND OF THE INVENTION

1. Field of the Invention

The present invention relates to a throttle valve control system for controlling operation of a throttle valve in an internal combustion engine of a vehicle.

2. Description of the Prior Art

Recently, as the result of the decrease in the power output of the internal combustion engines of exhaust emission controlled automotive vehicles and the tendency of the ordinary passenger cars to become increasingly large and heavy, deterioration of the driving feeling has become a matter of concern. The speed regulation of a vehicle is conventionally accomplished through the depression of the accelerator pedal by the driver which operates the throttle valve to vary the amount of mixture drawn into the engine and thereby vary the power output or rotational speed of the engine and consequently the movement of the accelerator pedal representing the driver's will must be accurately reflected in the rotation of the throttle valve. It is also necessary that in place of only one kind of linear relationship, the characteristic between the movement of the accelerator pedal (hereinafter referred to as the accelerator position) and the opening of the throttle valve must be varied in many different ways in accordance with the output and operating conditions of the engine. Further, while the movement of the accelerator pedal is usually adjusted chiefly by the movement of the driver's ankle which is limited to a narrow range of about 10 cm in terms of the movement of the toe and this movement of the accelerator pedal is changed into a rotary motion or reciprocal motion through a link mechanism and is then transmitted to the throttle valve of the carburetor, this link mechanism enters into the bonnet beneath the driver's seat and extends to the carburetor of the engine. Thus, the link mechanism passes through the relatively limited portions with the result that the transmission of the motion is extremely complicated. For instance, in the case of a known type of link mechanism, the movement of the accelerator pedal must be subjected to a number of changes, namely, it must be changed into rotary motion, rotary motion, reciprocating motion, rotary motion, reciprocating motion and rotary motion again before it can be transmitted to the carburetor throttle valve and consequently the movement of the ankle which reflects the driver's will, i.e., the movement of the accelerator pedal cannot be accurately transmitted to the throttle valve. In other words, since the movement of the accelerator pedal must be subjected to a number of changes, no linear proportionality holds between the movement of the accelerator pedal and the rotation of the throttle valve and moreover looseness of the motion changing joints or the like tends to produce hysteresis. Furthermore, in the case of the wire mechanism, there is a disadvantage that due to the necessity to eliminate looseness of the wire or due to the effect of friction, considerable force is required to transmit the movement of the accelerator pedal and this causes the driver to feel that the accelerator pedal is stiff. Still further, with either of the link mechanism and the wire mechanism, it is not an easy matter to adjust the range of movement of the accelerator pedal to an amount that suits the driver. With either of the link mechanism and the wire mechanism, it is possible to obtain only one kind of characteristic between the accelerator position and the throttle valve opening and it is extremely difficult to cause the characteristic to vary in accordance with varying operating conditions of the engine.

SUMMARY OF THE INVENTION

It is an object of this invention to provide a throttle valve control system which overcomes the foregoing deficiencies.

It is another object of this invention to provide a throttle valve control system wherein the movement of the accelerator pedal representing the driver's will is rapidly and accurately transmitted to the throttle valve.

It is still another object of this invention to provide a throttle valve control system wherein the movement of the accelerator pedal is electrically transmitted to the throttle valve thereby making the range of movement of the accelerator pedal readily adjustable to suit any driver.

In accordance with the invention, there is thus provided a throttle valve control system comprising an accelerator position sensor for detecting the position of an accelerator pedal, a throttle valve opening sensor for detecting the opening of a throttle valve, a control circuit for receiving the output signals of the two sensors to generate an output signal and a reversible motor whose direction and amount of rotation are controlled in accordance with the output signal of the control circuit to open and close the throttle valve, whereby the opening of the throttle valve is controlled in accordance with the position of the accelerator pedal.

DESCRIPTION OF THE PREFERRED EMBODIMENTS

The present invention will now be described in greater detail with reference to the illustrated embodiments.

Figure 1:
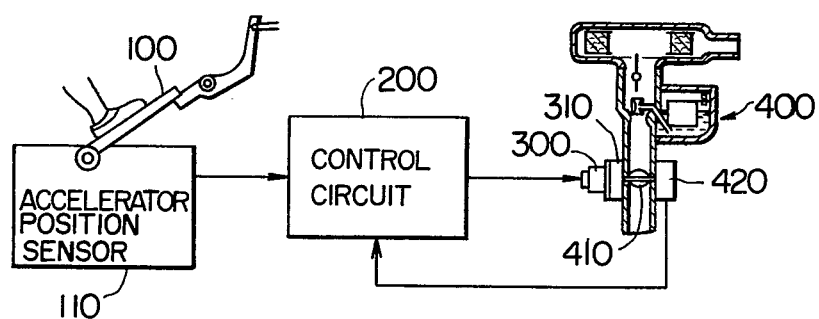
FIG. 1 is a schematic diagram showing the general construction of a throttle valve control system according to the invention.
Figure 2:
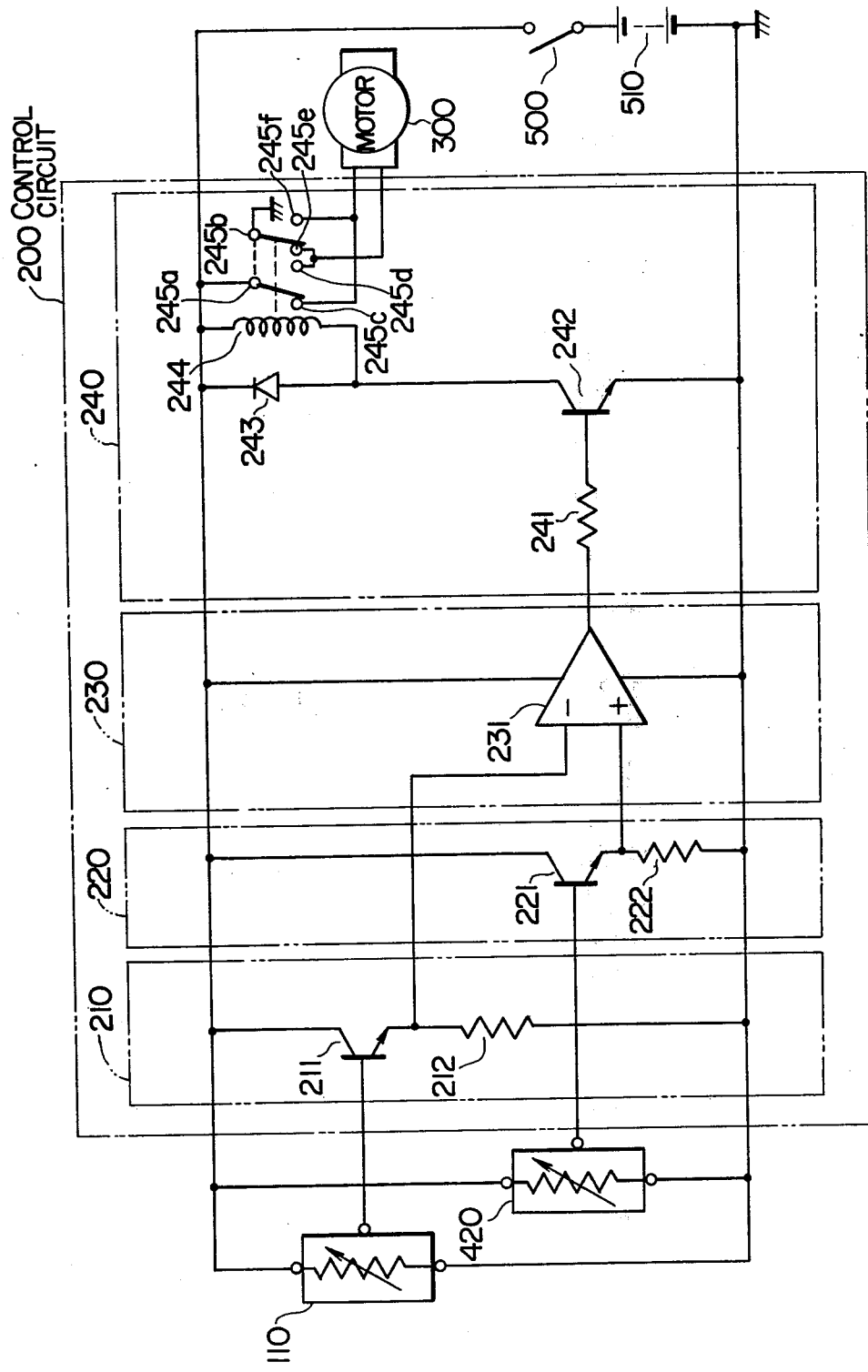
FIG. 2 is a wiring diagram showing a first embodiment of the throttle valve control system according to this invention.

Referring first to FIG. 1 illustrating the general construction of a throttle valve control system of this invention, numeral 110 designates an accelerator position sensor connected to an accelerator pedal 100 for detecting the amount of depression of the accelerator pedal 100 controlled by the driver's foot to generate a voltage signal representing the accelerator position, and it comprises a known type of potentiometer. Numeral 200 designates a control circuit for controlling the direction of rotation of a reversible motor 300 in response to the output signals of the accelerator position sensor 110 and a throttle valve opening sensor 420 for detecting the opening of a throttle valve 410 in a carburetor 400. As will be seen from the detailed construction shown in FIG. 2, the control circuit 200 comprises a current amplifier circuit 210 consisting of an emitter follower circuit including a transistor 211 connected to the adjustable terminal of the potentiometer 110 and a resistor 212, a current amplifier circuit 220 consisting of an emitter follower circuit including a transistor 221 connected to the adjustable terminal of the potentiometer 420 and a resistor 222, a comparison circuit 230 including an operational amplifier 231 and a relay-type driving circuit 240 including an input resistor 241, a transistor 242, a counter electromotive force absorbing diode 243, movable contacts 245a and 245b, fixed contacts 245c, 245d, 245e and 245f and a relay coil 244. Numeral 500 designates a switch operatively associated with the ignition key switch of the engine which is not shown, 510 a DC power source for energizing the control circuit 200, the reversible motor 300 and the potentiometers 110 and 420. The reversible motor 300 consists of the ordinary DC motor which is connected to the throttle valve 410 through a friction clutch 310 (shown in FIG. 1) and whose direction of rotation is changed in accordance with the output signal of the control circuit 200. In this embodiment, the rotor of the motor 300 should preferably be of a type whose inertia is small. The friction clutch 310 is of a known type so that when the throttle valve 410 having a limited range of rotation is stopped by a stopper or the like (not shown) at one end of its predetermined range of rotation, no excessive torque is applied to the driving shaft of the reversible motor 300 by virtue of the built-in slipping mechanism. The throttle valve opening sensor 420 is connected to the shaft of the throttle valve 410 for detecting its opening and the sensor 420 consists of a known type of potentiometer.

With the construction described above, the system of this invention operates as follows. When the driver depresses the accelerator pedal 100 for accelerating purposes, this increases the output voltage from the accelerator position sensor 110 and the current amplifier circuit 210 which is applied to the inverting input terminal of the comparator 231, while the output voltage from the throttle valve opening sensor 420 and the current amplifier circuit 220 which is applied to the non-inverting input terminal of the operational amplifier 231 remains at its previous low value. Consequently, the output of the operational amplifier 231 goes to a "0" level so that the transistor 242 of the relay circuit 240 is turned off and no current flows to the relay coil 244 connecting the contact 245a to the contact 245d and the contact 245b to the contact 245f. Thus, the reversible motor 300 is rotated in the forward direction and the throttle valve 410 is opened into a position corresponding to the position of the accelerator pedal 100 thus increasing the quantity of the mixture drawn into the engine and thereby accelerating the vehicle. On the other hand, when the driver reduces the amount of depression of the accelerator pedal 100 for deceleration, the output voltage from the accelerator position sensor 110 and the current amplifier circuit 210 decreases, while the output voltage from the throttle valve opening sensor 420 and the current amplifier circuit 220 remains at its high level, causing the output of the operational amplifier 231 to go to a "1" level. As a result, the transistor 242 of the relay circuit 240 is turned on and current flows in the relay coil 244 connecting the contact 245a to the contact 245c and the contact 245b to the contact 245e. Thus, the reversible motor 300 is rotated in the reverse direction and the throttle valve 410 is closed. Thus, when the relationship between the position of the accelerator pedal 100 and the opening of the throttle valve 410 deviates from a predetermined relationship due to the movement of the accelerator pedal 100 by the driver's will, for example, the reversible motor 300 is immediately brought into operation and the throttle valve 410 is operated in such a manner that the predetermined relationship is attained.

Figure 4A:
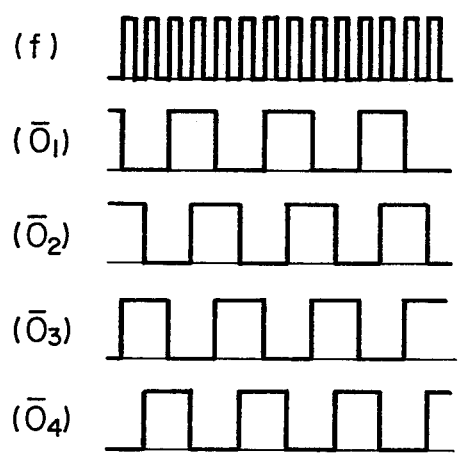
FIGS. 4A and 4B are signal waveform diagrams which are useful in explaining the operation of the reversible shift register used in the system of this invention.
Figure 4B:
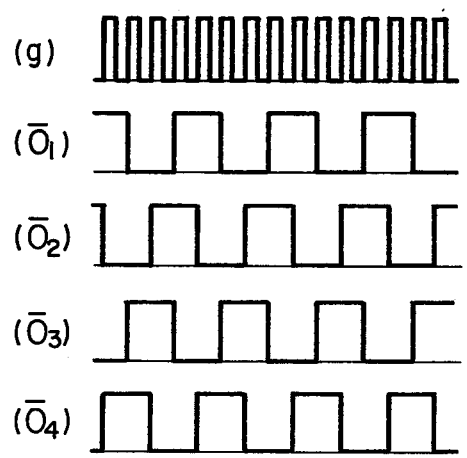
Figure 3:
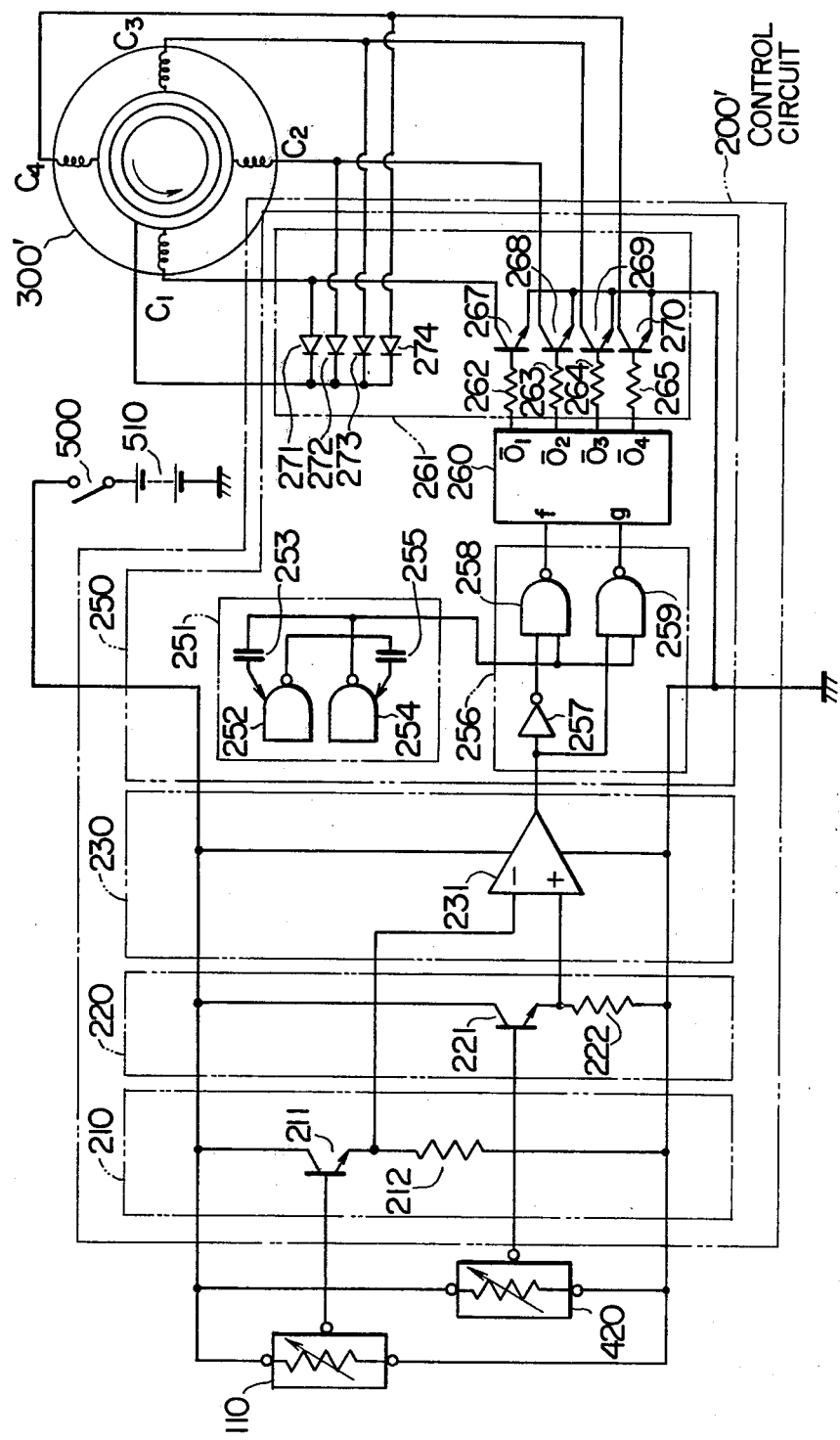
FIG. 3 is a wiring diagram showing a second embodiment of the throttle valve control system of this invention wherein the reversible motor is a pulse motor.

Next, a second embodiment of the throttle valve control system shown in FIG. 3 and employing the reversible motor 300 consisting of a pulse motor will now be described with reference to FIGS. 3, 4A and 4B. In FIG. 3, numeral 200' designates a control circuit for controlling the reversible motor consisting of a pulse motor 300' in place of the DC motor 300 and its current amplifier circuits 210 and 220 and comparison circuit 230 are identical with those used in the first embodiment shown in FIG. 2. Numeral 250 designates a motor driving circuit responsive to the output signal of the comparison circuit 230 for supplying activation signals to field coils $C_1$, $C_2$, $C_3$ and $C_4$ of the pulse motor 300' to rotate it in the forward or reverse direction. The motor driving circuit 250 comprises an oscillator circuit 251 consisting of an astable multivibrator including NAND gates 252 and 254 with expander terminals and capacitors 253 and 155 for generating pulse signals having a predetermined frequency, a reversible command circuit 256 including a NOT gate 257 and NAND gates 258 and 259, a reversible shift register 260 and a power circuit 261 including resistors 262, 263, 264 and 265, transistors 267, 268, 269 and 270 and counter electromotive force absorbing diodes 271, 272, 273 and 274.

In operation, when the accelerator pedal 100 is depressed so that the output of the comparator 231 goes to the "0" level, the output of the NAND gate 259 in the reversible command circuit 256 goes to the "1" level so that the output of the NAND gate 258 consisting of the inverted pulse signals of the pulse signals from the oscillator circuit 251 is applied to an input terminal $f$ of the reversible shift register 260. When these pulse signals are applied to the input terminal $f$, output terminals $\overline{O}_1$, $\overline{O}_2$, $\overline{O}_3$ and $\overline{O}_4$ of the reversible shift register 260 are successively shifted as shown in FIG. 4A. Consequently, the transistors 267, 268, 269 and 270 of the power circuit 261 are successively turned on, and the coils $C_1$, $C_2$, $C_3$ and $C_4$ of the pulse motor 300' are similarly energized so that two phases are energized at a time thus rotating the rotor of the pulse motor 300' in the direction of the arrow in the Figure and thereby opening the throttle valve 410 attached to the rotor. On the other hand, when the depression of the accelerator pedal 100 is reduced so that the output of the comparator 231 goes to the "1" level, the NAND gate 259 of the reversible command circuit 256 passes pulse signals which are then applied to an input terminal g of the reversible shift register 260. When the pulse signals are applied to the terminal g, the outputs of the reversible shift register 260 are shifted as shown in FIG. 4B so that the transistors 270, 269, 268 and 267 of the power circuit 261 are successively turned on and the coils $C_4$, $C_3$, $C_2$ and $C_1$ are energized two phases at a time thus rotating the rotor in a direction opposite to the direction of the arrow in the Figure and thereby closing the throttle valve 410.

Figure 5:
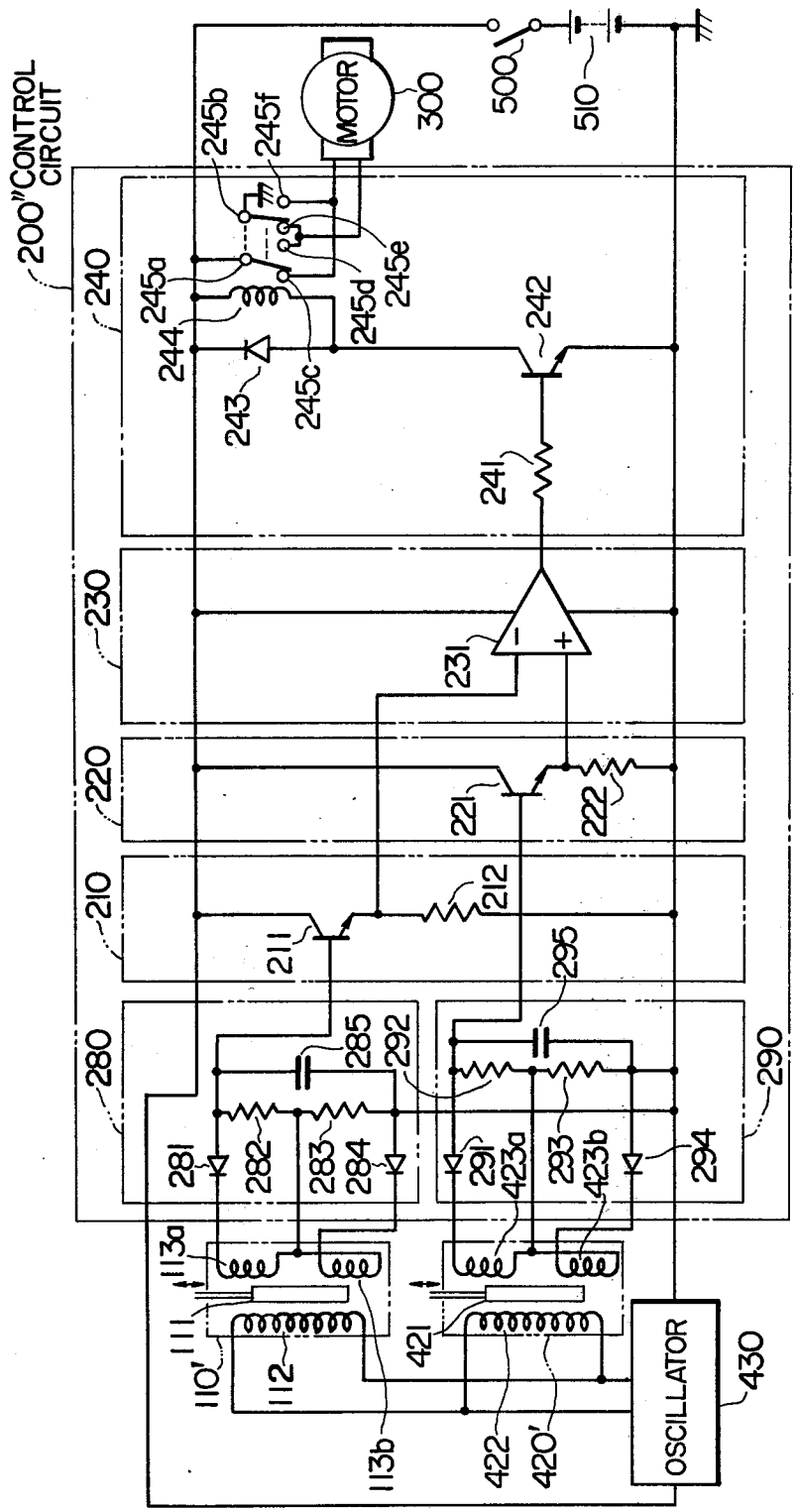
FIG. 5 is a wiring diagram showing a third embodiment of the throttle valve control system of this invention wherein each of its accelerator position sensor and throttle valve opening sensor is a differential transformer.

While the first and second embodiments of the system of this invention have been described in connection with the accelerator position sensor 110 and the throttle valve opening sensor 420 each comprising a potentiometer, the similar results may be obtained in case one or the other or both of the accelerator position sensor 110 and the throttle valve opening sensor 420 comprise differential transformers. This will be explained with reference to the third embodiment of the system of this invention shown in FIG. 5. In the Figure, numeral 110' designates an accelerator position sensor comprising a differential transformer, 112 a primary coil, 113a and 113b secondary coils, 111 a magnetic core having its one end connected to an accelerator pedal 100 so as to reciprocate in accordance with the movement of the accelerator pedal 100. Numeral 420' designates a throttle valve opening sensor comprising a differential transformer, 422 a primary coil, 423a and 423b secondary coils, 421 a magnetic core having its one end connected to the throttle valve 410 so as to reciprocate in accordance with the rotation of the throttle valve 410. Numeral 430 designates an oscillator for periodically varying the voltage applied to the primary coils 112 and 422 of the differential transformers. Numeral 200" designates a control circuit designed for use with the system employing the differential transformers and its input section includes a rectifier circuit 280 consisting of diodes 281 and 284, resistors 282 and 283 and a capacitor 285 and a rectifier circuit 290 consisting of diodes 291 and 294, resistors 292 and 293 and a capacitor 295. The remaining current amplifier circuits 210 and 220, comparison circuit 230 and relay circuit 240 are identical with those used in the first embodiment.

In operation, since the voltage applied to the primary coils 112 and 422 is varied periodically, the current flowing in the primary coils 112 and 422 is varied producing a secondary electromotive force in the secondary coils 113a, 113b, 423a and 423b. Depending on the position of the magnetic cores 111 and 421 in the differential transformers 110' and 420', a difference in secondary electromotive force occurs between the secondary coils 113a and 113b and between the secondary coils 423a and 423b. These differences in secondary electromotive force are respectively detected by the rectifier circuits 280 and 290 which in turn produce at their outputs voltage signals respectively proportional to the positions of the magnetic cores 111 and 421 or the positions of the accelerator pedal 100 and the throttle valve 410. The remainder of the operation is the same as the first embodiment and will not be described.

Figure 6:
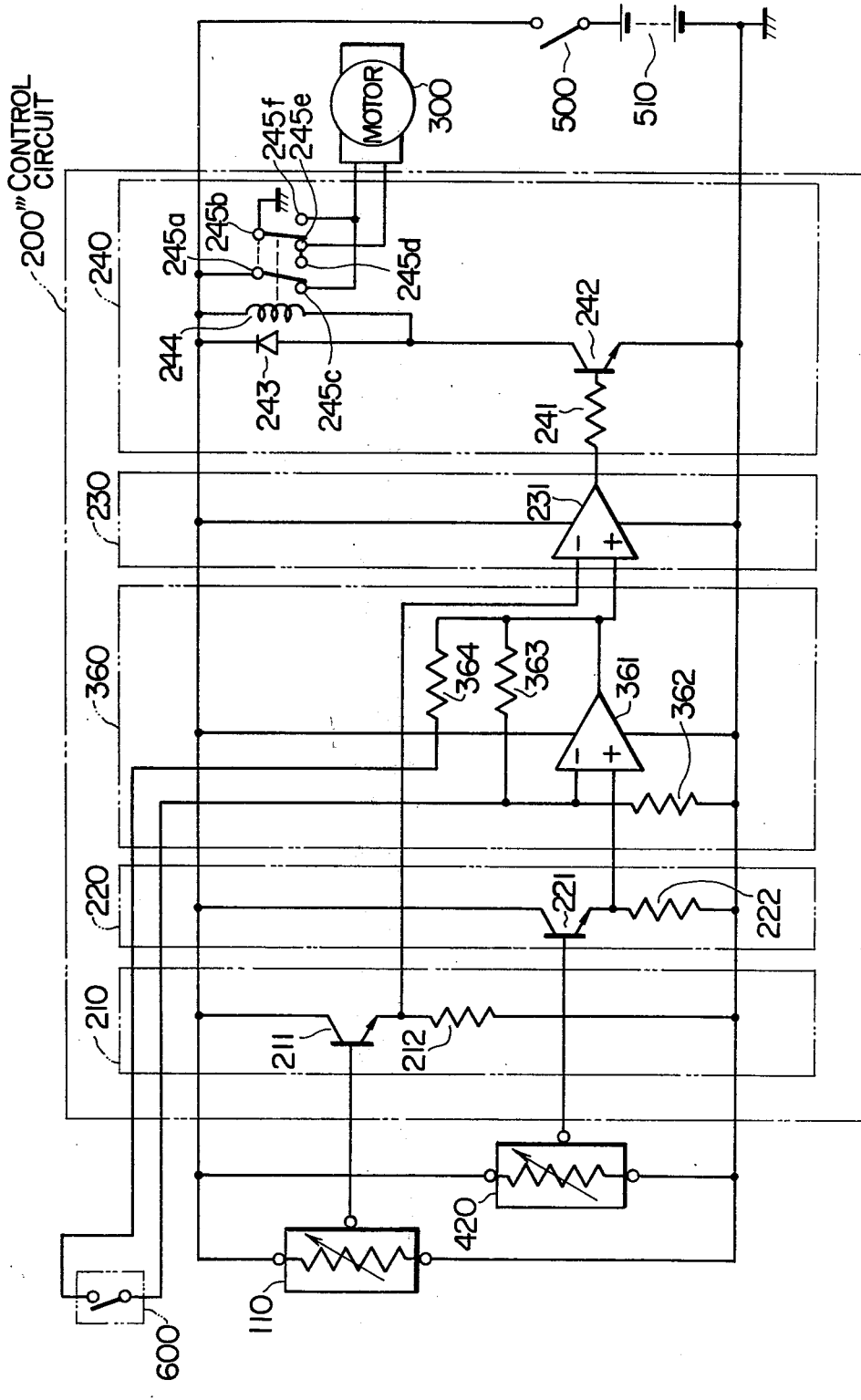
FIG. 6 is a wiring diagram showing a fourth embodiment of the throttle valve control system of this invention.

Next, the fourth embodiment shown in FIG. 6 will be described. In this embodiment, an engine condition sensor for detecting the operating conditions of an internal combustion engine comprises a sensor for detecting the temperature of engine cooling water, and numeral 600 designates this water temperature sensor comprising a known type of bimetal, thermal wax or ferrite magnet and serving as a switch which opens when the engine cooling water temperature is low and which closes when the cooling water temperature is at the ordinary working temperature (about 80° C). Numeral 200''' designates a control circuit in which its current amplifier circuits 210 and 220, comparison circuit 230 and relay circuit 240 are identical with those of the previously described control circuit 200 and the control circuit 200''' additionally comprises a noninverting amplifier circuit 360 including resistors 362, 363 and 364 and an operational amplifier 361. The resistor 364 is connected in parallel with the resistor 363 through the water temperature sensor 600.

With the construction described above, the operation of this embodiment is as follows.

Figure 7:
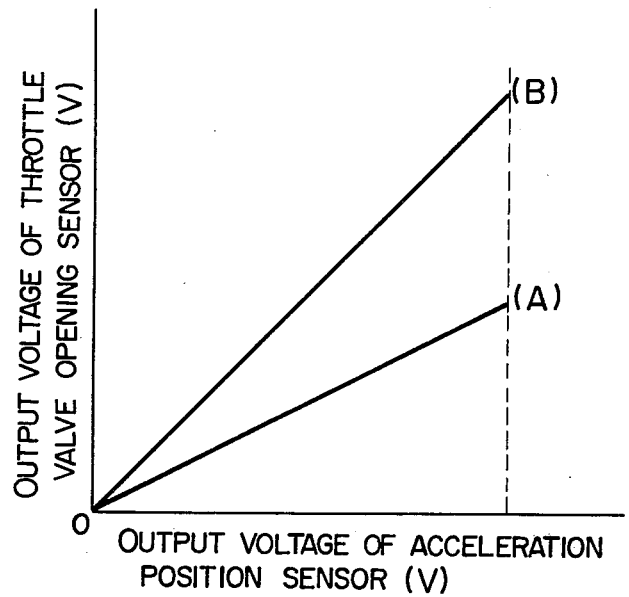
FIG. 7 is a characteristic diagram showing the relationship between the outputs of the accelerator position sensor and the throttle valve opening sensor used in the system of this invention.

When the engine cooling water temperature is low as during the starting periods or after the starting of the engine, the water temperature sensor 600 is opened for a short period of time with the result that resistor 363 acts as the negative feedback resistor of the operational amplifier 361 providing a large amplification factor and the throttle valve opening signal from the throttle valve opening sensor 420 is amplified with this large factor and compared with the accelerator position signal from the accelerator position sensor 110 in comparison circuit 230. Consequently, the output signals of the accelerator position sensor 110 and the throttle valve opening sensor 420 are balanced with each other with the characteristic relationship shown by the straight line A in FIG. 7. On the other hand, when the engine is warmed up sufficiently so that the cooling water temperature reaches the ordinary working temperature (about 80° C), the water temperature sensor 600 is closed and the negative feedback resistor of the operational amplifier 361 now consists of a small, combined parallel resistance of the resistors 363 and 364 thus reducing the amplification factor. Consequently, the output signals of the accelerator position sensor 110 and the throttle valve opening sensor 420 are balanced with each other with the one-to-one correspondence or the characteristic relationship shown by the straight line B in FIG. 7. As a result, when the engine cooling water temperature is low, the opening of the throttle valve 410 is held small relative to the position of the accelerator pedal 100 with the result that there is no danger of applying any excessive load to the engine until the engine is warmed up thus improving the durability of the engine and reducing the emissions of harmful exhaust gases (carbon monoxide and hydrocarbons, etc.).

While, in the embodiment described above, the negative feedback resistance of the operational amplifier 361 is changed by the water temperature sensor 600 which detects variations of the engine cooling water temperature, it is possible and equally effective to use for example a vehicle speed switch so that the control of the throttle valve 410 is adjusted in accordance with the operating conditions of the engine. Further, while, in this embodiment, the amplification factor of the signal representing the opening of the throttle valve 410 is changed, it is possible to amplify the accelerator position signal and change its amplification factor.

Figure 8:
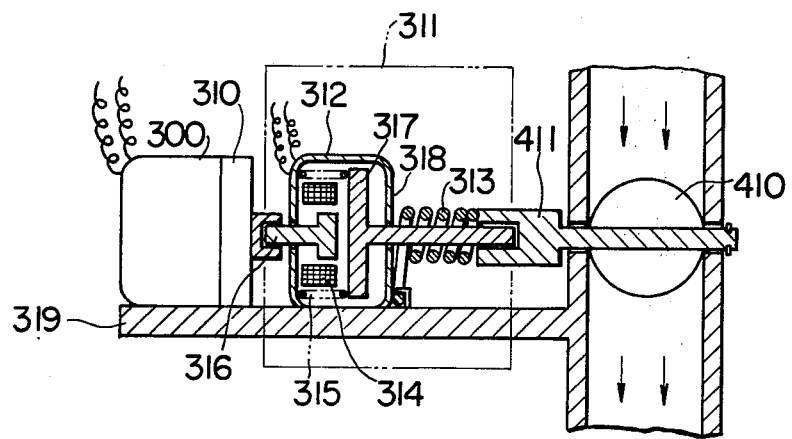
FIG. 8 is a schematic diagram showing an embodiment of the principal parts of the throttle valve actuator in the system of this invention employing a safety device.

Now referring to FIG. 8, an embodiment of a safety device usable with the system of this invention will be described. In the Figure, numeral 311 designates a safety device, 312 a magnetic clutch of the safety device 311 comprising a solenoid 314, a fixed member 316 made of a magnetic material and connected to the shaft of the reversible motor 300, a compression spring 315, a case 318 and a movable member 317 made of a magnetic material and connected to the shaft 411 of the throttle valve 410, whereby when the solenoid 314 is energized the fixed member 316 and the movable member 317 come into close contact with each other, whereas the two members are separated from each other upon deenergization of the solenoid 314. Numeral 313 designates a torsion coil spring having its ends respectively connected to the movable member 317 and a mounting stay 319, whereby when the clutch 312 is energized the rotational motion of the reversible motor 300 is transmitted to the throttle valve 410 through the friction clutch 310, the fixed member 316 and the movable member 317 and through a throttle valve shaft 411 connected to the movable member 317 thus controlling the throttle valve 410 through the reversible motor 300, whereas when the magnetic clutch 312 is de-energized the fixed member 316 and the movable member 317 are separated from each other and the throttle valve 410 is fully closed by the torsion coil spring 313.

With the construction described above, the operation of the safety device is as follows. In the normal operating conditions of the control circuit 200 and the reversible motor 300, the magnetic clutch 312 is energized thus controlling the throttle valve 410 in the above-mentioned manner, whereas when there is any fault in the control circuit 200, the reversible motor 300 and the signal lines interconnecting them, the magnetic clutch 312 is de-energized and the throttle valve 410 is closed safely bringing the vehicle to a stop.

Of course, a key pin, for example, may be provided in place of the magnetic clutch 312, so that the key pin is withdrawn by means of a solenoid or the like to disengage the throttle valve 410 with the reversible motor 300.

While, in the above-described embodiments, the friction clutch 310 is used to prevent the application of any excessive torque to the motor driving shaft, a switch or the like may be used so as to stop the reversible motor 300 as soon as the throttle valve 410 comes to its fully closed position.

While the above-mentioned embodiments of this invention have been described in connection with the spark-ignition engine having the carburetor 400, the system of this invention may be used with the compression-ignition engine to perform the similar function since the rotational speed of this engine is also regulated by operating the throttle valve through the accelerator pedal so as to adjust the fuel quantity controlling vacuum. Further, while, in these embodiments, the accelerator pedal of foot-operated type is used, the present invention is of course applicable to the type which is operated by manually turning a grip as in the case of auto-bicycles.

Still further, if, in the future, automatic driving systems, etc., are necessitated by diversification of transport means, the system of this invention is capable of using other speed regulating signals such as vehicle speed signal and intake mixture quantity signal in addition to the previously mentioned position signals of the accelerator pedal 100 and the throttle valve 410, thus controlling the operation of the throttle valve 410 and thereby properly regulating the speed of the vehicle to ensure improved safety and driveability.

We claim:

1. A throttle valve control system for an internal combustion engine comprising:
   accelerator means movably mounted on a vehicle and operable as required;
   accelerator sensing means connected to said accelerator means for generating an electric signal corresponding to the amount of movement of said accelerator means;
   a throttle valve disposed in an intake passage of said internal combustion engine for controlling the area of opening of said intake passage;
   throttle valve opening sensing means connected to said throttle valve for generating an electrical signal corresponding to the opening of said throttle valve;
   a reversible motor operatively connected to said throttle valve for operating said throttle valve;
   engine condition sensing means provided in said internal combustion engine for detecting the operating conditions of said engine;
   a control circuit joined to each of said sensing means and connected to said reversible motor for controlling the direction and amount of rotation of said reversible motor, said control circuit including an amplifier for amplifying one of the electric signals of said accelerator sensing means and said throttle valve opening sensing means by an amplification factor which is changed in accordance with said detected operating conditions, a comparison circuit for comparing the amplified signal from said amplifier and the other of said two electric signals as to relative magnitude so as to generate a comparison signal, and a driving circuit responsive to said comparison signal for determining the direction of rotation of said reversible motor, whereby the opening of said throttle valve is maintained at a value corresponding to the operating conditions of said engine and the amount of movement of said accelerator means; and
   a power source for energizing said reversible motor and said control circuit.

2. A system according to claim 1, wherein said engine condition sensing means is a water temperature sensor for switching on and off the supply of current in accordance with the cooling water temperature of said engine.

3. A throttle valve control system for an internal combustion engine comprising:
   accelerator means movably mounted on a vehicle and operable as required;
   accelerator sensing means connected to said accelerator means for generating a signal corresponding to the amount of movement of said accelerator means;
   a throttle valve disposed in an intake passage of said internal combustion engine for controlling the area of opening of said intake passage;
   throttle valve opening sensing means operatively connected to said throttle valve for generating a signal corresponding to the opening of said throttle valve;
   a reversible motor connected to said throttle valve for opening and closing said throttle valve during respective forward and reverse rotations thereof, said reversible motor being energized by a constant current in both forward and reverse directions;

a control circuit connected to said accelerator sensing means and said throttle valve sensing means for compring the output signals of said two sensing means and controlling the rotation of said reversible motor to maintain the opening of said throttle valve at a value corresponding to the amount of movement of said accelerator means said control circuit reversing the direction of said reversible motor at every change of the comparison result thereof, and said reversible motor and said throttle valve being interconnected through clutch means for slipping said reversible motor when said throttle valve goes beyond a predetermined range of rotation; and a power source for energizing said reversible motor and said control circuit.

4. A system according to claim 3, wherein said accelerator sensing means is a potentiometer whose resistance varies in accordance with the amount of movement of said accelerator means, and said throttle valve opening sensing means is another potentiometer whose resistance value varies in accordance with the opening of said throttle valve.

5. A system according to claim 3, wherein said accelerator sensing means includes differential transformer means having a magnetic core connected to said accelerator means and movable in response to the movement of said accelerator means, a primary coil disposed near said magnetic core, an oscillator connected to said primary coil to apply an AC electric signal to said primary coil, and a pair of secondary coils magnetically coupled to said primary coil through said magnetic core whereby an electric signal is generated from said secondary coils, and said throttle valve opening sensing means includes another differential transformer means having a magnetic core connected to said throttle valve and movable in response to the opening of said throttle valve, a primary coil connected to said oscillator and disposed near said magnetic core, and a pair of secondary coils magnetically coupled to said primary coil through said magnetic core whereby an electric signal is generated from said secondary coils.

6. A throttle valve control system for an internal combustion engine of a vehicle comprising:

an accelerator pedal movably disposed in a vehicle and operable as required;

accelerator position sensing means connected to said accelerator pedal for generating an electric signal corresponding to the amount of movement of said accelerator pedal;

a throttle valve disposed in a carburetor of an internal combustion engine for controlling the amount of mixture fed to said engine;

throttle valve opening sensing means connected to said throttle valve for generating an electric signal corresponding to the opening of said throttle valve;

a reversible motor operatively connected to said throttle valve for opening and closing said throttle valve during respective forward and reverse rotations thereof, said reversible motor being energized by a constant current in both forward and reverse directions;

a control circuit connected to said reversible motor for controlling the direction and amount of rotation of said reversible motor, said control circuit including a comparison circuit for receiving two signals respectively corresponding to the output signals of said accelerator position sensing means and said throttle valve opening sensing means and comparing said two signals as to relative magnitude to generate an on-off signal, and a driving circuit responsive to said on-off signal to reverse the direction of rotation of said reversible motor, said driving circuit being adapted to reverse the flow direction of said constant current at every change of said on-off signal, whereby the opening of said throttle valve is maintained at a value corresponding to the amount of movement of said accelerator pedal; and a power source for energizing said two sensing means, said reversible motor and said control circuit.

7. A throttle valve control system for an internal combustion engine of a vehicle comprising:

an accelerator pedal movably disposed in a vehicle and operable as required;

accelerator position sensing means connected to said accelerator pedal for generating an electric signal corresponding to the amount of movement of said accelerator pedal;

a throttle valve disposed in a carburetor of an internal combustion engine for controlling the amount of mixture fed to said engine;

throttle valve opening sensing means connected to said throttle valve for generating an electric signal corresponding to the opening of said throttle valve;

a reversible pulse motor, having a plurality of windings, operatively connected to said throttle valve for opening and closing said throttle valve during respective forward and reverse rotations thereof, said reversible motor being energized by a constant current in both forward and reverse directions;

a control circuit connected to said reversible motor for controlling the direction and amount of rotation of said reversible motor, said control circuit including a comparison circuit for receiving two signals respectively corresponding to the output signals of said accelerator position sensing means and said throttle valve opening sensing means and comparing said two signals as to relative magnitude to generate an on-off signal, and a driving circuit responsive to said on-off signal to reverse the direction of rotation of said reversible motor, said driving circuit being adapted to sequentially energize said windings in response to a train of pulse signals of a fixed frequency and reverse the sequence of energization at every change of said on-off signal, whereby the opening of said throttle valve is maintained at a value corresponding to the amount of movement of said accelerator pedal; and a power source for energizing said two sensing means, said reversible motor and said control circuit.

8. A throttle valve control system for an internal combustion engine comprising:

accelerator means movably mounted on a vehicle and operable as required;

accelerator sensing means connected to said accelerator means for generating a signal corresponding to the amount of movement of said accelerator means;

a throttle valve disposed in an intake passage of said internal combustion engine for controlling the area of opening of said intake passage;

throttle valve opening sensing means operatively connected to said throttle valve for generating a signal corresponding to the opening of said throttle valve;

a reversible motor connected to said throttle valve for opening and closing said throttle valve during respective forward and reverse rotations thereof, said reversible motor being energized by a constant current in both forward and reverse directions;

a control circuit connected to said accelerator sensing means and said throttle valve sensing means for comparing the output signals of said two sensing means and controlling the rotation of said reversible motor to maintain the opening of said throttle valve at a value corresponding to the amount of movement of said accelerator means said control circuit reversing the direction of said reversible motor at every change of the comparison result thereof;

safety means including means disposed between said throttle valve and said reversible motor for releasing said throttle valve from said reversible motor under predetermined conditions;

biasing means connected to said throttle valve for placing said throttle valve in a fully closed position in response to said releasing operation of said biasing means; and a power source for energizing said reversible motor and said control circuit.

9. A system according to claim 8, wherein said accelerator sensing means is a potentiometer whose resistance varies in accordance with the amount of movement of said accelerator means, and said throttle valve opening sensing means is another potentiometer whose resistance value varies in accordance with the opening of said throttle valve.

10. A system according to claim 8, wherein said accelerator sensing means includes differential transformer means having a magnetic core connected to said accelerator means and movable in response to the movement of said accelerator means, a primary coil disposed near said magnetic core, an oscillator connected to said primary coil to apply an AC electric signal to said primary coil, and a pair of secondary coils magnetically coupled to said primary coil through said magnetic core whereby an electric signal is generated from said secondary coils, and said throttle valve opening sensing means includes another differential transformer means having a magnetic core connected to said throttle valve and movable in response to the opening of said throttle valve, a primary coil connected to said oscillator and disposed near said magnetic core, and a pair of secondary coils magnetically coupled to said primary coil through said magnetic core whereby an electric signal is generated from said secondary coils.

* * * * *